Aug. 24, 1943.   E. F. SCHWELLER   2,327,672
REFRIGERATING APPARATUS.
Filed April 16, 1941   7 Sheets-Sheet 1

INVENTOR.
EDMUND F. SCHWELLER.
BY
Spencer, Hardman and Fahr.

Patented Aug. 24, 1943

2,327,672

UNITED STATES PATENT OFFICE 2,327,672

REFRIGERATING APPARATUS

Edmund F. Schweller, Dayton, Ohio, assignor to General Motors Corporation, Dayton, Ohio, a corporation of Delaware Application April 16, 1941, Serial No. 388,838

19 Claims. (Cl. 62—89)

This invention relates to refrigerating apparatus and particularly to household refrigerators.

An object of my invention is to provide an improved multi-temperature household refrigerator.

Another object of my invention is to provide a household refrigerator cabinet with a plurality of spaces or compartments maintained at different temperatures relative to one another for the storage and preservation of a variety of food products.

Another object of my invention is to provide an improved arrangement within a multi-temperature household refrigerator which affords a larger moist cold compartment and a compact, more convenient storage space for meats, fowl, frozen foods and other products that require near freezing or sub-freezing temperatures to keep them fresh for longer periods of time, while at the same time providing sufficient space within the refrigerator for the reception of trays containing water to be frozen into ice cubes.

Still another object of my invention is to provide a compact arrangement in a refrigerator cabinet for a sharp freezing chamber and a near freezing food storage chest whereby the remainder of the interior of the refrigerator may be in the form of a large moist cold compartment for the storage of vegetables and other foods left over from the table.

A further object of my invention is to provide a partitioning device for dividing the interior of a refrigerator cabinet chamber into a plurality of compartments and which partitioning device carries a member forming a common closure for the front of a freezing chamber and for the front of a cold food storage chest formed in one of the compartments and which closure member is in addition to the cabinet chamber closing door so as to prevent the escape of air from the one compartment when the chamber door is opened to gain access to the other compartment.

A still further object of my invention is to provide a refrigerating apparatus of the character described in the preceding objects with means for forcing or maintaining one wall of a cold food storage chest in intimate thermal contact with a side wall of an evaporator mounted at the side of the chest.

In carrying out the foregoing objects, it is a still further object of my invention to provide for the removal of the partitioning device, the closure member carried thereby and other elements associated therewith from the evaporator and outwardly of the cabinet chamber as a unit.

Incident to the main objects of my invention as set forth above, numerous other objects and advantages will become apparent from the following description and claims, reference being had to the accompanying drawings wherein:

Figure 1:
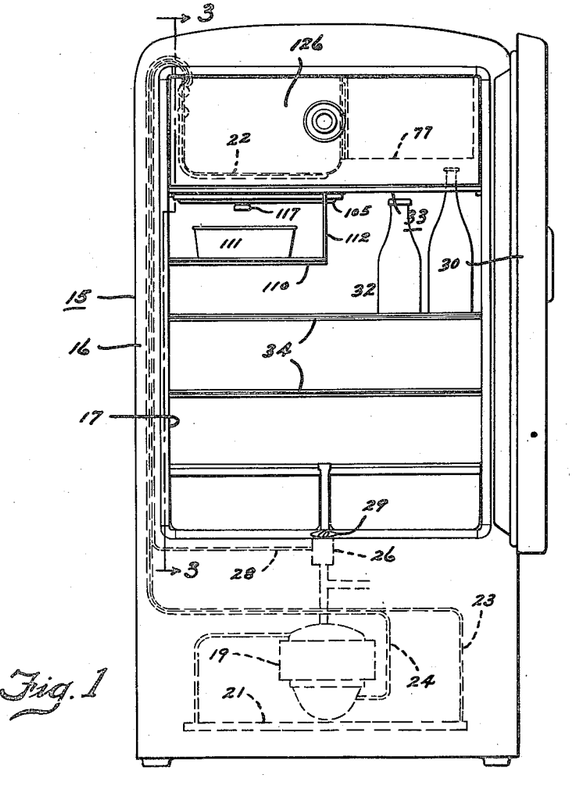
Fig. 1 is a front view of a multi-temperatured household refrigerator cabinet constructed in accordance with my invention.
Figure 3:
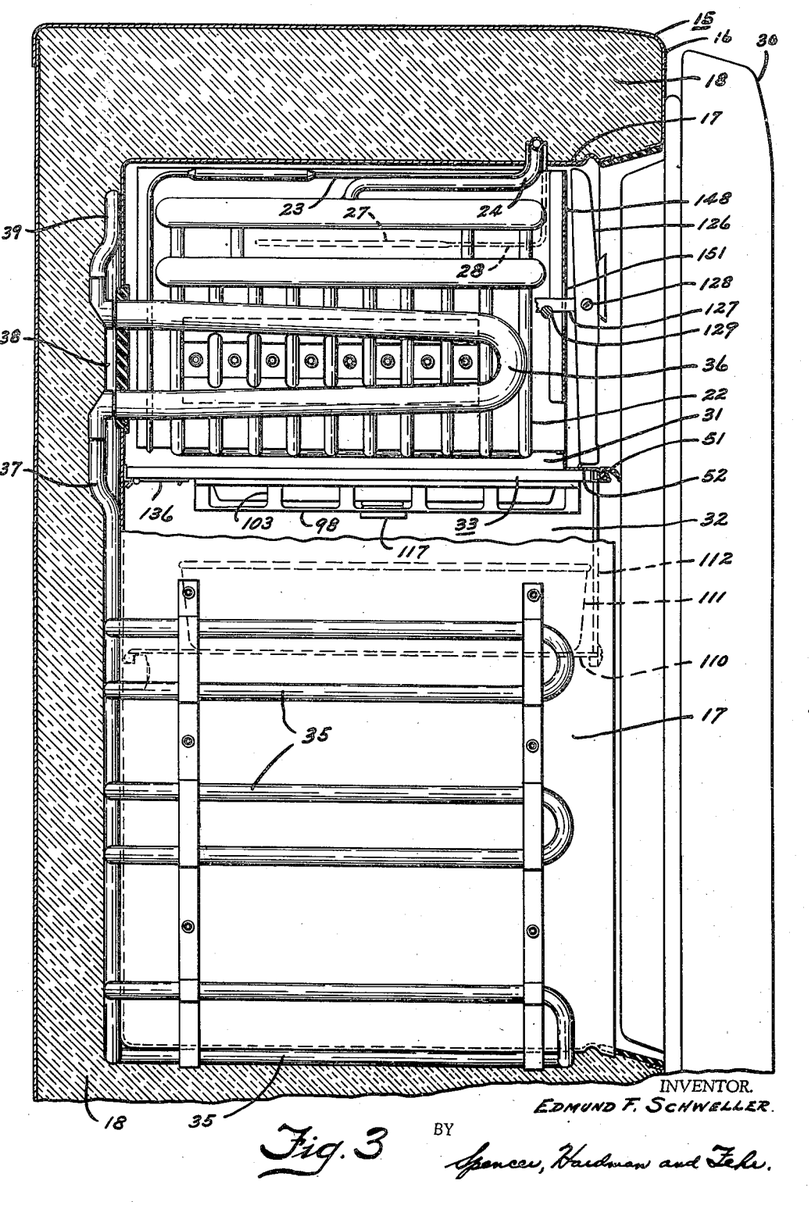
Fig. 3 is an enlarged vertical sectional view of a part of the refrigerator cabinet shown in Fig. 1 and is taken on the line 3—3 thereof.

Referring to the drawings and particularly Figs. 1 and 3, there is shown a refrigerator cabinet 15 having outer metal panels or walls 16 and an inner metal liner member 17 spaced apart by any suitable insulating material 18 to provide insulated walls of a chamber within the cabinet. A machine compartment within cabinet 15 below the insulated chamber thereof houses a sealed motor-compressor unit 19 and a condenser 21. Rigidly secured in place in any suitable or desirable manner at the top corner portion of the insulated chamber of cabinet 15, is a primary evaporator 22 which is connected by a liquid line 23 and a suction line 24 with the condenser 21, and motor-compressor unit 19 respectively. The operation of unit 19 is controlled by a thermostatic switch means 26 provided with a thermostatic control bulb 27 mounted upon a wall of the evaporator 22 and connected to switch 26 by a pipe 28 (see Fig. 3). This switch 26 is provided with a temperature regulating knob 29 (see Fig. 1) so that it may be regulated to maintain different desired freezing temperatures in the primary evaporator 22 by properly contolling the operation of motor-compressor unit 19. The knob 29 also controls the unit 19 to cause defrosting periods of the evaporator 22. The different freezing temperatures are required in freezing varieties of frozen eatables within ice trays adapted to be placed in or on the evaporator 22.

Figure 2:
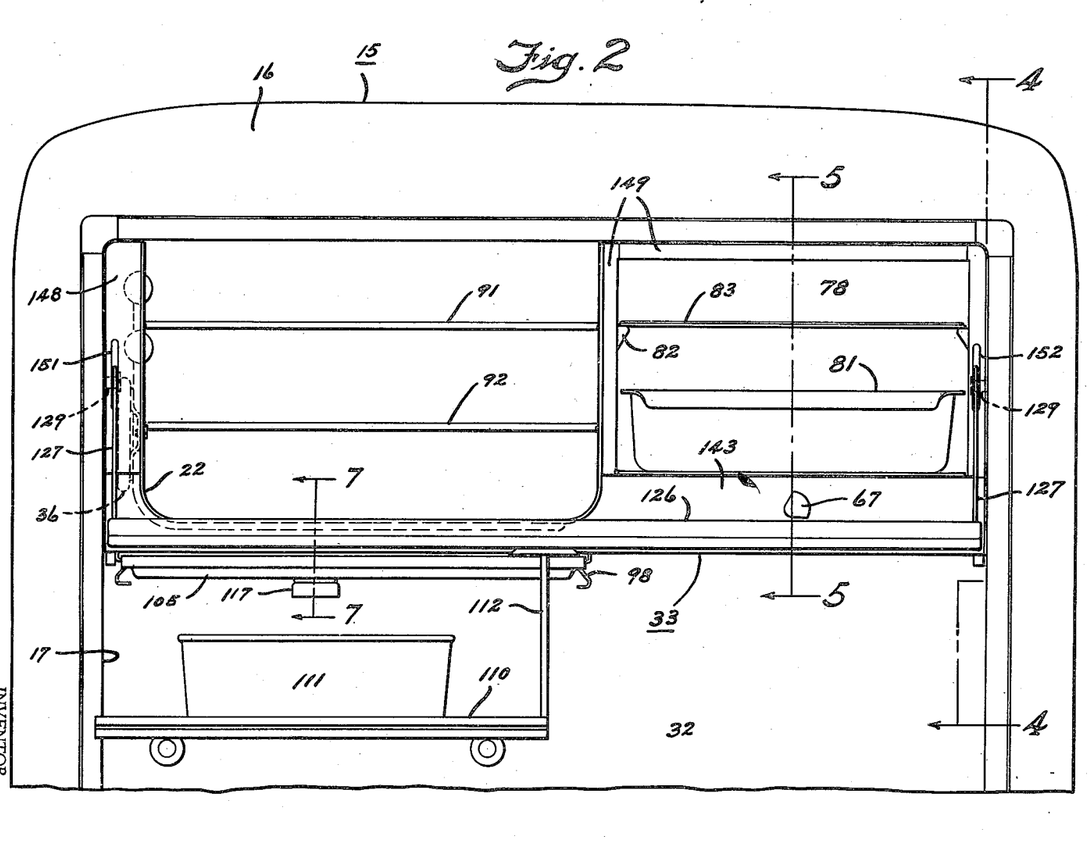
Fig. 2 is an enlarged front view of the upper portion of the refrigerator cabinet illustrated in Fig. 1 and showing a partitioning means dividing the cabinet chamber into upper and lower compartments.

The insulated cabinet chamber is divided into an upper compartment 31 and a lower food storage compartment 32 by a partitioning device or means generally represented by the reference character 33. The cabinet chamber is provided with an insulated door structure 30 which normally closes the chamber opening and provides access to the compartments 31 and 32. Shelves 34 may be vertically spaced apart within the lower compartment 32 for supporting food products to be stored therein. Evaporator 22, above the partitioning means 33, chills the upper compartment 31 and the lower compartment 32 is cooled by a refrigerant evaporating portion 35 of a closed secondary refrigerant circuit associated with the cabinet 15. The refrigerant evaporating portion 35 is in the form of a pipe coil having its loops clamped or otherwise suitably secured to the outer surface of the metal liner 17 below the partitioning means 33. The closed secondary circuit also includes a refrigerant condensing portion in the form of a pipe loop 36 which is clamped to a side wall of the primary evaporator 22 (see Figs. 2 and 3). The volatile liquid in this secondary circuit which is cooled and condensed in heat transfer relationship with the primary evaporator 22 is drained from the pipe loop 36 by a conduit 37 and is fed to the evaporating pipe loops 35 which extend across the bottom sides and back of the liner 17 below partition 33. Volatile liquid refrigerant upon evaporating in the pipe loops 35, to cool the lower compartment 32 to a temperature above that at which water freezes, flows upwardly through a pipe 38 having a gooseneck trap 39 formed therein and thence into the condensing portion or pipe loop 36 of the secondary circuit. The evaporated refrigerant is condensed in the condenser 36 of the closed secondary circuit and is recirculated to the evaporating portion or loops 35 thereof.

Figure 5:
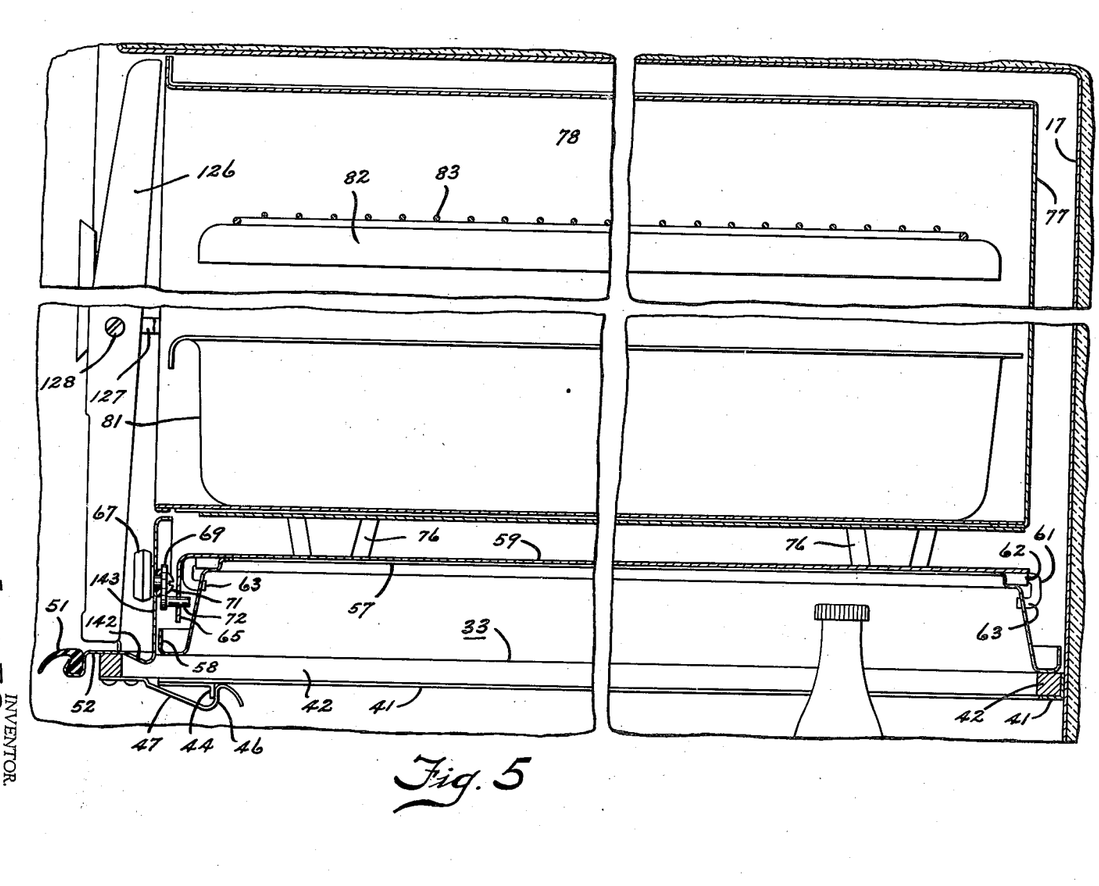
Fig. 5 is a fragmentary sectional view of the upper part of the refrigerator cabinet and is taken on the line 5—5 of Fig. 2.
Figures 6, 8:
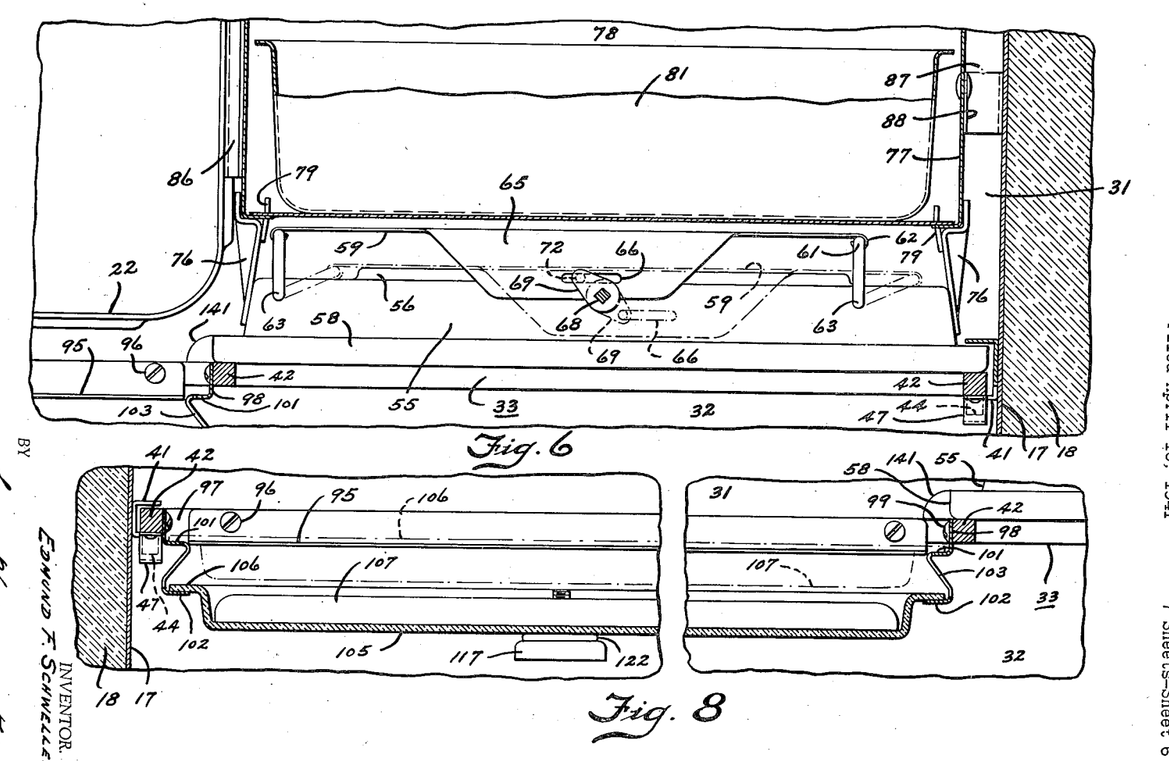
Fig. 6 is a sectional front view of the refrigerator cabinet taken on the line 6—6 of Fig. 4 showing means for operating a cover for an opening in the partition.
Fig. 8 is a sectional view taken on the line 8—8 of Fig. 7 showing the pan member disclosed in Fig. 7 supported beneath and in alignment with the opening in the partition.
Figure 7:
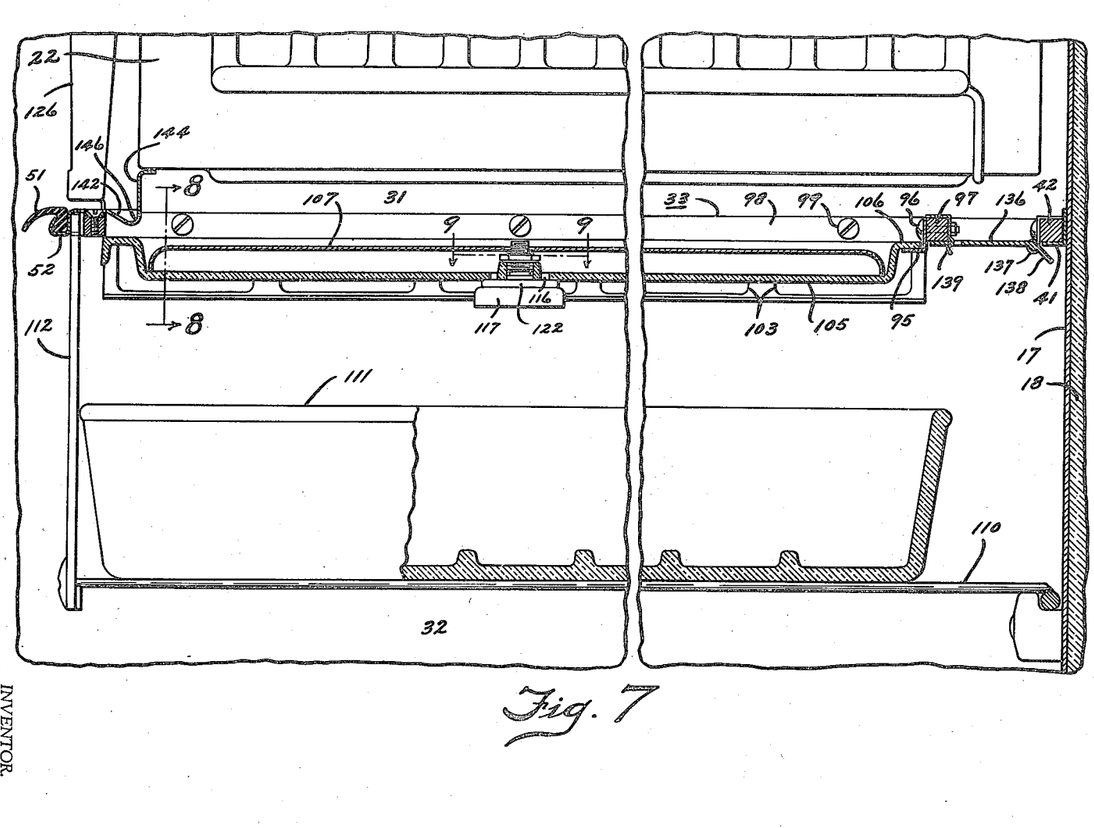
Fig. 7 is a sectional view of a part of the refrigerator cabinet taken on the line 7—7 of Fig. 2 showing a pan member closing an opening in the compartment dividing partition.

A suitable ledge in the form of a sheet metal track 41 is rigidly secured to the sides and back of the liner 17 for removably supporting the partitioning means within the insulated cabinet chamber (see Figs. 5, 6 and 7). The partitioning means 33 comprises a metal frame 42 which extends along the back, sides and a portion of the front edge thereof. This frame 42 is received within the track 41 to position the partition in its properly supported locality within the cabinet chamber. A metal piece 44 is secured to the underside of the front portion of each of the side tracks 41 (see Figs. 5, 6 and 8) for receiving a hooked end part 46 of spring clips 47 attached to the partition side edges for removably locking the partitioning means upon its support 41. A resilient gasket 51 extends entirely across the front edge of partitioning means 33 and is secured thereto by being clamped within a curled over part of a sheet metal member 52. This gasket 51 is adapted to be engaged by the inner face of the chamber door 30 as illustrated in Fig. 3, and the sealing of door 30 against the front of partitioning means 33 together with the cooperation of the frame 42 with its supports 41 is intended to normally isolate the air within the upper compartment 31 from the air in the lower compartment 32. One side of the partitioning means is formed by an inverted pan-like element 55 rigidly secured to and extending upwardly of the frame 42. Pan-like element 55 includes an upwardly directed portion 56 which is provided with an opening 57 therein, (see Fig. 5). The pan-like element 55 has its lower edge turned upwardly as at 58 to provide a trough around the sides thereof. The opening 57 in element 55 is normally closed by a lid or cover 59. Each of the side edges of lid or cover 59 is rolled over a rod 61, as at 62, which rods have their ends bent, as at 63, and pivotally fitted into small openings provided at the front and at the back of the pan-like element 55. A portion of cover 59, at the front thereof, is turned downwardly, as at 65, and provided with a horizontally elongated opening 66 (see Fig. 6). A knob 67 (see Fig. 5) is pivotally mounted in an opening provided in the metal member 52 in front of the pan element 55 and is provided with a squared shank end portion 68 (see Fig. 6). An arm 69 is secured by a screw 71 to the squared end 68 of the shank of knob 67 and this arm has a rounded finger portion 72 projecting therefrom and extending into the elongated opening 66 in the front lip 65 of cover 59. Knob 67, arm 69 and its extension 72 form a lever mechanism which when operated will raise the cover 59 upwardly away from the top portion 56 of pan element 55 to uncover the opening 57 for a purpose to be hereinafter described.

Figure 4:
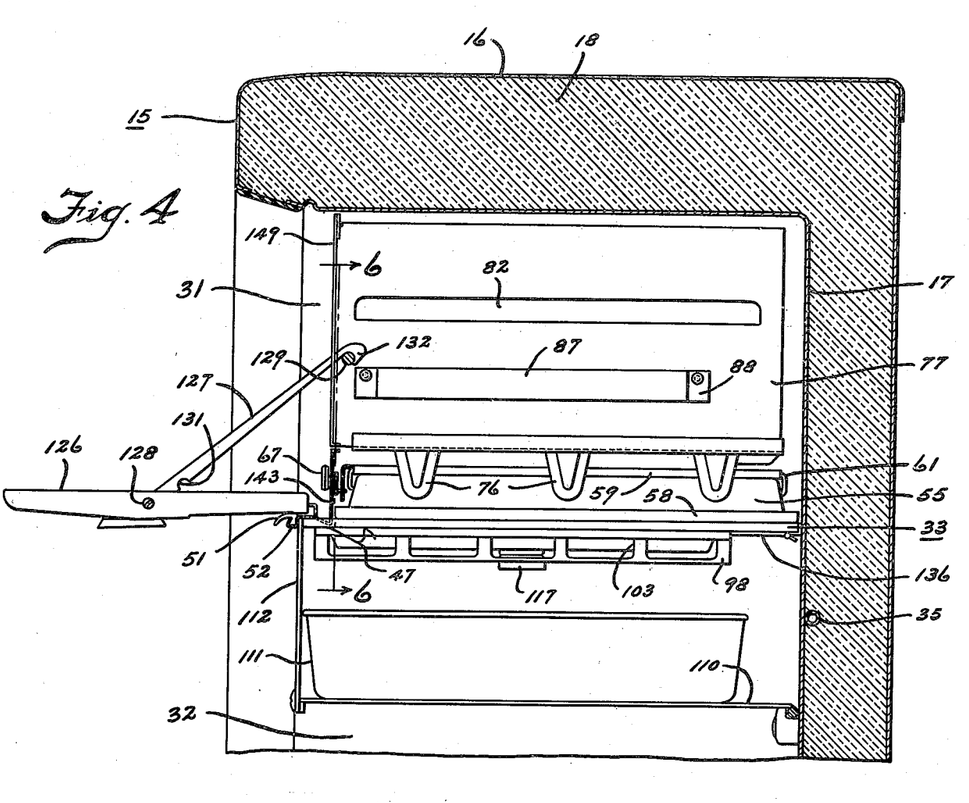
Fig. 4 is a vertical sectional view of the refrigerator cabinet taken on the line 4—4 of Fig. 2.

Uprights 76, preferably of low heat conductivity metal, are secured to the sides of pan-like element 55 and form supports for a box-like metal structure 77. This metal structure 77 comprises top, bottom, end and side walls which form a food storage chest 78 within upper compartment 31, of the cabinet chamber. A pin 79 secured to the rear supports or uprights 76 (see Fig. 6) extends through an opening in the bottom wall of the box-like structure 77 and prevents outward movement of this structure relative to the pan-like element 55. The bottom wall of chest 78 supports a large tray 81, which tray is adapted to contain meats, fish or the like, to be kept cold. A depression provided in each of the side walls of the metal structure 77 projects into the chest 78, as at 82 (see Figs. 2 and 5), and forms supports for a shelf 83 above tray 81. This shelf 83 is adapted to receive additional meats or the like to be stored within the cold chest. Vertically disposed resilient metal pieces 86 secured to the one upright wall of box structure 77, forming the cold chest 78 (see Fig. 6) are adapted to directly contact a side wall of the primary evaporator 22. A normally bowed spring-like metal member 87 has its ends 88 secured to the upright wall of box structure 77 (see Figs. 4 and 6) opposite the side wall thereof to which the pieces 86 are secured. The spring-like member 87 bears or reacts against the liner 17 and forces the pieces 86 into intimate thermal contact with the side wall of the evaporator 22. This insures efficient conduction of cold from evaporator 22 to the walls of the cold chest 78 and to meats or the like stored therein.

Evaporator 22 is of the U-shaped sheet metal type wherein the double sheet metal walls thereof form the sides and bottom of a sharp freezing chamber within the upper compartment 31 and provides refrigerant expansion passages in the walls for evaporating the refrigerant of the primary refrigerating system. The evaporator 22 is provided with two shelves 91 and 92 (see Fig. 2) and the shelves are refrigerated by conduction from the side walls of the evaporator. Shelves 91 and 92 are adapted to receive trays containing water to be frozen and the lower shelf 92 is removable from the evaporator in order to provide a large space within the freezing chamber for the reception of large pieces of meat or chickens and the like which may be supported upon the refrigerated bottom wall of the evaporator. Thus the upper compartment 31 of the refrigerator cabinet chamber is divided, by walls of the substantially U-shaped evaporator 22 and by the chest forming structure 77 into a plurality of spaces for the reception of various types of foods. Since the evaporator 22 is normally maintained below freezing, articles to be frozen or previously frozen foods, such as fish, berries and the like, are usually placed within the freezing chamber formed by the evaporator. Since the one wall of the food storage chest 78 is maintained in intimate thermal contact with a side wall of evaporator 22, by the spring 87, the interior of this chest is normally at a temperature of from 30° F. to 35° F., and is, therefore, suitable for the storage of fresh cuts of meats at very low temperatures. For example, the tray 81 may contain a large cut of meat, such as a roast, while smaller cuts or pieces, such as chops and the like, may be supported upon the shelf 83, within the cold chest. The freezing chamber and the cold chest structure in the present disclosure provides an improved arrangement for quickly freezing substances to be frozen, for the storage of frozen foods and the storage of foods at a temperature near freezing.

Figure 9:
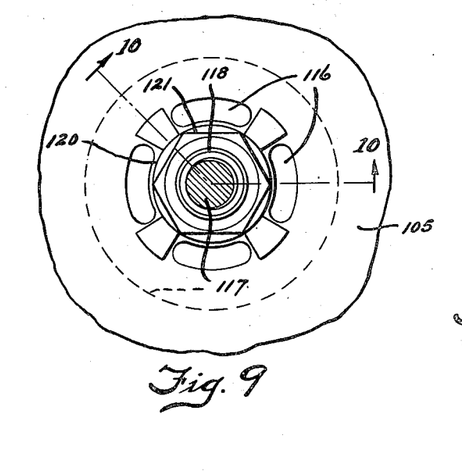
Fig. 9 is a fragmentary sectional view taken on the line 9—9 of Fig. 7 and enlarged to illustrate the drain openings provided in the pan member.
Figure 10:
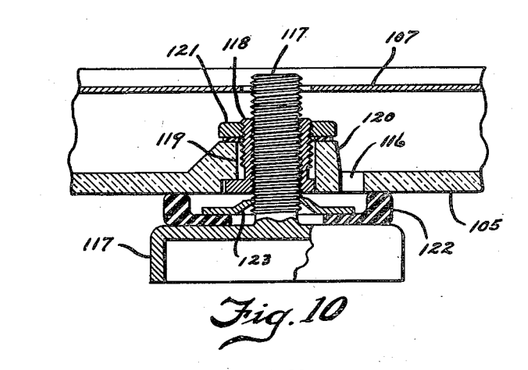
Fig. 10 is a sectional view taken on the line 10—10 of Fig. 9 showing a valve for closing the drain openings in the pan member.

Partitioning means 33 is provided with an opening immediately below the evaporator 22 and this opening is bounded by certain portions of the frame 42. A back metal angle piece 95 is secured by screws 96 to a cross-portion 97 of frame 42 (see Figs. 7 and 8) and side pieces 98 are secured by screws 99 to the side portions of the frame 42 which bounds the opening therein beneath evaporator 22. Each side piece 98 comprises a first horizontal ledge 101 and a second or lower horizontal ledge 102 (see Fig. 8). The portion of pieces 98 intermediate the ledges 101 and 102 are cut out as at 103 to provide a plurality of openings therein. The ledges 101 are disposed substantially in the same horizontal plane with the ledge portion of back angle piece 95 and cooperate therewith to form a support for a shallow pan 105. This pan 105 is formed of any suitable or desirable molded plastic material and is provided with a lip or flange 106 which is normally received by the ledge portion 101 of the metal pieces 98 to close the opening in the partitioning means 33 located below the evaporator 22. A metal inverted plate-like reflector element 107 is disposed in the pan 105 to provide a dead air space between the pan 105 and the bottom wall of evaporator 22. A utility shelf 110 located below the pan 105 supports a tray 111 and a brace 112 for the shelf 110 is detachably secured to the front edge of partition 33. The upper end of brace 112 is movable out of engagement with partition 33 and out of the path of pan 105 to permit this pan to be slid forwardly off of the supporting ledges 101. Pan 105 may then be slid inwardly upon the ledges 102 as shown in Fig. 8, for the purpose of providing ventilation of the air between the compartments 31 and 32. At the center of pan 105 there is provided a series of openings 116 (see Figs. 9 and 10), which openings are normally closed by a valve device. The valve device, for closing the openings 116, includes a rotatable thumb screw 117 threaded into a bushing 118 which is secured within an opening 119, provided in a boss 120 of pan 105, by a nut 121. A valve in the form of a resilient washer 122 is secured to screw 117 by a nut 123 and is normally compressed between the head of screw 117 and the bottom surface of pan 105 to close the plurality of openings 116 provided around the boss 120.

A member 126 extending entirely across the cabinet chamber opening is pivotally mounted at its lower edge upon the front portion of the partitioning means 33 inwardly of the gasket 51 thereon and serves as a common closure for the open front of the freezing chamber, formed by walls of evaporator 22, and for the open front of the cold chest 78 formed by walls of the structure 77. An arm 127 is pivotally secured by a screw 128 to each side edge of closure member 126 (see Fig. 4). These arms 127 removably rest on and are adapted to slide upon studs 129 secured to and extending inwardly of the cabinet chamber side walls or liner 17. Each arm 127 is provided with a cut away portion 131 near the closure member 126 and is provided with a hooked end portion 132. When the closure member 126 is in a vertical position to close the front of compartment 31, the cut out portion 131 of the arms 127 engages the studs 129 to retain the closure member in its vertical position (see Fig. 3). However, with the application of a little force to member 126, the engagement of the cut away portion 131 of arm 127 with the studs 129 will be overcome and the arms will move outwardly of compartment 31 simultaneously with the opening movement of member 126. Since the arms 127 slide upon the studs 129 when member 126 is being opened, the hooked end 132 of arms 127 will engage the studs 129 when member 126 is fully opened and support this member in a horizontal position. Thus, the closure member 126 serves as a transfer ledge at the front of compartment 31 to form in article support during rearrangement of articles in the upper compartment.

An auxiliary ventilating opening provided in the partitioning means 33, intermediate the cross frame portion 97 and the back frame 42 (see Fig. 7), is normally closed by a valve 136. This valve 136 is pivotally mounted upon a metal piece, as at 137, which metal piece is secured to the back frame 42. The valve 136 has a depending finger grip extension 138 which may be utilized to open or close the valve. Normally valve 136 is maintained at closed position by a spring clip 139 which engages same and is secured to the frame portion 97.

It will be noted that the trough around the sides of inverted pan-like element 55 and formed by the upturned edge 58 thereof has a spout portion 141 (see Figs. 6 and 8) extending outwardly therefrom over the flanged edge 106 of pan 105 for a purpose to be presently described. It will also be noted that the sheet metal member 52 at the front of the partition means 33 extends entirely across the cabinet chamber along with the means 33 and has a trough portion 142 provided therein (see Figs. 5 and 7). This member 52 comprises the upstanding portion 143 located in front of the pan-like element 55 (see Fig. 5) through which the shank portion of knob 67 extends and another upstanding portion 144 adjacent the front of the primary evaporator 22. One or more holes 146 are provided in the trough portion 142 of member 52 above the front edge of pan 105 (see Fig. 7). A trim strip 148 is disposed between the one edge of evaporator 22 and the side wall of the cabinet chamber (see Fig. 2) at the front of the chamber. A frame-like trim member 149 is disposed at the front edges of the box-like chest forming structure 77 to cooperate with the chamber walls and with a wall of evaporator 22. The trim strip 148 and member 149 closes the space between the elements with which they cooperate so as to improve the appearance of the front portion of the upper compartment 31. Strip 148 and trim frame 149 are provided with openings 151 and 152 respectively through which the arms 127 of closure member 126 project to engage the studs 129.

The various ventilating openings of the partitioning means 33 are normally closed so that when the chamber door 30 engages the gasket 51 of means 33, this partitioning means cooperates with the walls of the cabinet chamber to substantially isolate compartments 31 and 32 from air circulation therebetween. Evaporator 22 is maintained below freezing temperatures to maintain the upper compartment at a low temperature. The evaporating portion 35 of the secondary circuit maintains the lower food storage compartment 32 at temperatures above freezing. The low temperature of primary evaporator 22 causes moisture to be withdrawn from the air within the upper compartment 31 and this moisture collects in the form of frost upon walls of evaporator 22 and results in the air within compartment 31 being of low relative humidity. The air within the lower compartment 32 is not cooled to such a low temperature and is, therefore, normally of a higher relative humidity with respect to the air within compartment 31. Frequently, too much moisture will accumulate in the lower compartment 32 and may be removed therefrom by ventilating the dry air of the upper compartment with the air of the lower compartment. By the arrangement of the cover 59 for the opening 57 in the pan-like element 55 of partitioning means 33, this cover may be raised relative to the top of element 55, by operation of the knob 67. The raised position of cover 59 is illustrated in Fig. 6, of the drawings, and it will be noted that the opening 57 is uncovered and thereby provides a limited or controlled amount of ventilation between the upper and lower compartments 31 and 32. This controlled ventilation permits dry air from compartment 31 to circulate into compartment 32 and the dry air takes up excess moisture from the lower compartment. Since the air of the lower compartment 32 may be put in communication with the air of the upper compartment 31 it is desired to periodically defrost or cause melting of frost from evaporator 22. When frost is melted from the evaporator 22 and from walls of the chest forming structure 77, the defrosting water flows into the trough 58 from structure 77 and outwardly of this trough by way of the spout 141 and into the pan 105. Defrosting water drips from evaporator 22 directly into pan 105 and this pan serves to direct the drip water into the tray 111 by way of the openings 116 in the bottom of the pan 105. Drip water flowing down the front of the evaporator 22 and from the front of chest 78 is caught in the trough portion 142 of member 52 and is conveyed into the pan 105 by way of the holes 146 provided in the trough 142. The thumb screw 117 having been previously rotated to move the valve 122 away from the bottom of pan 105 and uncover the openings 116 whereby drip water collected in the pan is conveyed into the tray 111. The drip water accumulated in tray 111 may be disposed of by emptying the tray after the defrosting operation has been performed.

Should a predetermined and substantially permanent amount of ventilation be desirable between the compartments 31 and 32, the pan 105 may be removed from its supported position shown in Fig. 7 and placed in the supported position disclosed in Fig. 8, of the drawings. In this latter position of pan 105, it will be seen that the openings 103 provided in the pan supports 98 afford restricted flow of air from compartment 31 to compartment 32, while at the same time supporting pan 105 in a position to permit the carrying out of the defrosting of evaporator 22 as described. The association of the manually elevated cover 59 with respect to the opening 57 in the top of pan element 55 is such that defrosting water is prevented from dropping through the opening 57 irrespective of the position of cover 59 when defrosting of evaporator 22 and walls of cold chest 78 is caused to take place.

In the structure disclosed, the partitioning means 33 is composed of a plurality of elements, all of which are secured together as a unit and unitarily removable from the cabinet chamber. Thus when the hook portion 46 of clips 47 are released from the metal pieces 44 on supports 41, the entire partitioning means including its various component elements may be bodily removed from the primary evaporator 22 outwardly of the cabinet chamber. The outward movement of the partitioning means causes frame 42, pan 105, closure member 126, pan-element 55, supports 76 and box structure 77 to move outwardly of the cabinet chamber. During the act of moving the removable unit outwardly of the cabinet chamber, the unit is forced toward the right hand upright wall of liner 17 in a manner to compress the resilient spring 87. Compression of spring 87 in the manner described relieves the contact pressure of the metal pieces 86 and permits these pieces 86 to be readily slid forwardly of the evaporator 22. The removability of the entire partitioning structure from the cabinet facilities cleansing of the chamber, evaporator 22 and of the various elements of the partition.

The covers for the pans of the partitioning means 33 shield the bottom of the partition and prevent sweating of the underside of the partition. The pans can be readily formed to provide the necessary troughs and other defrosting water directing paths of flow leading to the water collecting tray disposed exteriorly of the upper compartment 31. These pans and their covers cooperate to normally provide an imperforate partition so as to isolate the compartments 31 and 32 from one another and yet are adjustable or are provided with selectively adjustable openings to permit limited ventilation between the compartments. The structure of pan element 55 whereby its portion inwardly of the front edge of the partition is raised above the plane of the partition frame 42 and above the bottom wall of the freezing chamber provides a tall space at the right hand side of the chamber 32 above the uppermost shelf 34 disposed therein. This portion of compartment 32 is ordinarily utilized for the storage of bottled beverages which are supported in a vertical position upon the upper shelf 34. Therefore, the top portion of tall bottled beverages, which otherwise would not fit between the partition 33 and the upper shelf 34, may be disposed in this space provided by the raised portion of pan element 55 inwardly of the front edge of partition 33.

While the form of embodiment of the invention as herein disclosed, constitutes a preferred form, it is to be understood that other forms might be adopted, all coming within the scope of the claims which follow.

What is claimed is as follows:

1. A refrigerating apparatus including a cabinet having walls defining a chamber therein provided with an access opening normally closed by a door, a partition cooperating with said cabinet chamber walls and with the inner face of said door dividing the cabinet chamber into an upper compartment and a lower compartment, said partition normally preventing communication of air between said compartments, a closed primary refrigerating system associated with said cabinet and including an evaporator disposed within said upper compartment at one side thereof and forming walls of a freezing chamber therein, means for cooling the interior of said lower compartment, means forming walls of a food storage chest within said upper compartment adjacent said evaporator, and resilient means acting between a wall of said cabinet chamber and one wall of the food storage chest for maintaining another wall of said chest in intimate thermal contact with a side wall of said evaporator.

2. A refrigerating apparatus including a cabinet having walls defining a chamber therein provided with an access opening normally closed by a door, a partition cooperating with said cabinet chamber walls and with the inner face of said door dividing the cabinet chamber into an upper compartment and a lower compartment, said partition normally preventing communication of air between said compartments, a closed primary refrigerating system associated with said cabinet and including an evaporator disposed within said upper compartment at one side thereof and forming walls of a freezing chamber therein, means for cooling the interior of said lower compartment, means forming walls of a food storage chest within said upper compartment adjacent said evaporator, and a member pivotally mounted upon the partition adjacent the front edge thereof and cooperating with said cabinet chamber walls to form a closure for said upper compartment whereby air is prevented from flowing outwardly of said freezing chamber and said food storage chest when said door is opened to gain access to said lower compartment, said partition, said food storage chest forming means and said closure member being removable as a unit from said evaporator outwardly of said cabinet chamber.

3. A refrigerating apparatus including a cabinet having walls defining a chamber therein provided with an access opening normally closed by a door, a partition cooperating with said cabinet chamber walls and with the inner face of said door dividing the cabinet chamber into an upper compartment and a lower compartment, said partition normally preventing communication of air between said compartments, a closed primary refrigerating system associated with said cabinet and including an evaporator disposed within said upper compartment at one side thereof and forming walls of a freezing chamber therein, means for cooling the interior of said lower compartment, means forming walls of a food storage chest within said upper compartment adjacent said evaporator, resilient means acting between a wall of said cabinet chamber and one wall of the food storage chest for maintaining another wall of said chest in intimate thermal contact with a side wall of said evaporator, a member pivotally mounted upon the partition adjacent the front edge thereof and forming a common closure for said freezing chamber and said food storage chest, and said closure member cooperating with said cabinet chamber walls to also form a door for said upper compartment whereby air is prevented from flowing outwardly of said freezing chamber, said food storage chest and said upper compartment when said cabinet chamber door is opened to gain access to said lower compartment.

4. A refrigerating apparatus including a cabinet having walls defining a chamber therein provided with an access opening normally closed by a door, a partition cooperating with said cabinet chamber walls and with the inner face of said door dividing the cabinet chamber into an upper compartment and a lower compartment, said partition normally preventing communication of air between said compartments, a closed primary refrigerating system associated with said cabinet and including an evaporator disposed within said upper compartment at one side thereof and forming walls of a freezing chamber therein, means for cooling the interior of said lower compartment, means forming walls of a food storage chest within said upper compartment adjacent said evaporator, resilient means acting between a wall of said cabinet chamber and one wall of the food storage chest for maintaining another wall of said chest in intimate thermal contact with a side wall of said evaporator, a member pivotally mounted upon the partition adjacent the front edge thereof and forming a common closure for said freezing chamber and said food storage chest, and said closure member cooperating with said cabinet chamber walls to also form a door for said upper compartment whereby air is prevented from flowing outwardly of said freezing chamber, said food storage chest and said upper compartment when said cabinet chamber door is opened to gain access to said lower compartment, said partition, said resilient means, said food storage chest forming means and said member being removable as a unit from said evaporator outwardly of said cabinet chamber.

5. A refrigerating apparatus including a cabinet having walls defining a chamber therein provided with an access opening normally closed by a door, a partition cooperating with said cabinet chamber walls and with the inner face of said door dividing the cabinet chamber into an upper compartment and a lower compartment, said partition normally preventing communication of air between said compartments, a closed primary refrigerating system associated with said cabinet and including an evaporator disposed within said upper compartment at one side thereof and forming walls of a freezing chamber therein, means for cooling the interior of said lower compartment, means forming walls of a food storage chest within said upper compartment adjacent said evaporator, said food storage chest being of less height than the freezing chamber whereby its bottom wall is disposed above the plane of the bottom wall of said freezing chamber, and said partition having a portion thereof under said food storage chest extending upwardly above the plane of the bottom wall of said freezing chamber to provide a space inwardly of its front edge for receiving the tops of tall bottles or the like adapted to be supported on a shelf disposed below said partition.

6. A refrigerating apparatus including a cabinet having walls defining a chamber therein provided with an access opening normally closed by a door, a partition cooperating with said cabinet chamber walls and with the inner face of said door dividing the cabinet chamber into an upper compartment and a lower compartment, said partition normally preventing communication of air between said compartments, a closed primary refrigerating system associated with said cabinet and including an evaporator disposed within said upper compartment at one side thereof and forming walls of a freezing chamber therein, means for cooling the interior of said lower compartment, means forming walls of a food storage chest within said upper compartment adjacent said evaporator, means for supporting said food storage chest upon said partition with its bottom wall in spaced relation thereto, said partition having a ventilating opening therein adjacent the bottom wall of said food storage chest, and movable means disposed in the space between the bottom wall of said chest and said partition for covering or uncovering the ventilating opening.

7. A refrigerating apparatus including a cabinet having walls defining a chamber therein provided with an access opening normally closed by a door, a partition cooperating with said cabinet chamber walls and with the inner face of said door dividing the cabinet chamber into an upper compartment and a lower compartment, said partition normally preventing communication of air between said compartments, a closed primary refrigerating system associated with said cabinet and including an evaporator disposed within said upper compartment at one side thereof and forming walls of a freezing chamber therein, means for cooling the interior of said lower compartment, means forming walls of a food storage chest within said upper compartment adjacent said evaporator, means for supporting said food storage chest upon said partition with its bottom wall in spaced relation thereto, said partition having a ventilating opening therein adjacent the bottom wall of said food storage chest, a flat cover for the ventilating opening in said partition, and means for raising said cover into the space between the bottom wall of said chest and said partition for uncovering the ventilating opening and permitting communication of air between said compartments.

8. A refrigerating apparatus including a cabinet having walls defining a chamber therein provided with an access opening normally closed by a door, a partition cooperating with said cabinet chamber walls and with the inner face of said door dividing the cabinet chamber into an upper compartment and a lower compartment, said partition normally preventing communication of air between said compartments, a closed primary refrigerating system associated with said cabinet and including an evaporator disposed within said upper compartment at one side thereof and forming walls of a freezing chamber therein, means for cooling the interior of said lower compartment, means forming walls of a food storage chest within said upper compartment adjacent said evaporator, said partition having an opening therein below said evaporator, a removable member normally closing the opening in said partition, and means carried by said partition for supporting said removable member below and in vertical alignment with the opening whereby the air within the upper compartment is permitted to communicate with the air in said lower compartment.

9. A refrigerating apparatus including a cabinet having walls defining a chamber therein provided with an access opening normally closed by a door, a partition cooperating with said cabinet chamber walls and with the inner face of said door dividing the cabinet chamber into an upper compartment and a lower compartment, said partition normally preventing communication of air between said compartments, a closed primary refrigerating system associated with said cabinet and including an evaporator disposed within said upper compartment at one side thereof and forming walls of a freezing chamber therein, means for cooling the interior of said lower compartment, means forming walls of a food storage chest within said upper compartment adjacent said evaporator, said partition having an opening therein below said evaporator, a removable member normally closing the opening in said partition, said partition being constructed and arranged to direct drip water received thereby from walls of said evaporator and walls of said food storage chest into said member, said member being provided with a drain opening normally closed by a valve, and said valve being operable to permit drip water to flow from said member outwardly of said upper compartment.

10. A refrigerating apparatus including a cabinet having walls defining a chamber therein provided with an access opening normally closed by a door, a partition cooperating with said cabinet chamber walls and with the inner face of said door dividing the cabinet chamber into an upper compartment and a lower compartment, said partition normally preventing communication of air between said compartments, a closed primary refrigerating system associated with said cabinet and including an evaporator disposed within said upper compartment at one side thereof and forming walls of a freezing chamber therein, means for cooling the interior of said lower compartment, means forming walls of a food storage chest within said upper compartment adjacent said evaporator, said partition having a first ventilating opening therein disposed below said food storage chest, a cover for said first ventilating opening, manually actuated means connected with said cover for moving same toward or away from said partition to close or open said first ventilating opening, said partition having a second opening therein below said evaporator, a removable member normally closing the second opening in said partition, and means carried by said partition for supporting said removable member below and in alignment with said second opening in said partition, said member supporting means being constructed and arranged to permit communication of air between said compartments through the second opening in said partition when said member is supported below said second opening in said partition.

11. A refrigerating apparatus including a cabinet having walls defining a chamber therein provided with an access opening normally closed by a door, a partition cooperating with said cabinet chamber walls and with the inner face of said door dividing the chamber into an upper compartment and a lower compartment, said partition normally preventing communication of air between said compartments, a closed primary refrigerating system associated with said cabinet and including an evaporator disposed within one of said compartments, means for cooling the interior of the other of said compartments, a member pivotally mounted upon said partition adjacent the front edge thereof and cooperating with said chamber walls to form a closure for one of said compartments whereby air is prevented from flowing outwardly of said one compartment when said door is opened to gain access to the other of said compartments, and said partition and said closure member being removable as a unit from said chamber.

12. A refrigerating apparatus including a cabinet having walls defining a chamber therein provided with an access opening normally closed by a door, a partition cooperating with said cabinet chamber walls and with the inner face of said door dividing the chamber into an upper compartment and a lower compartment, said partition normally preventing communication of air between said compartments, a closed primary refrigerating system associated with said cabinet and including an evaporator disposed within said upper compartment, means for cooling the interior of said lower compartment, a member pivotally mounted upon said partition adjacent the front edge thereof and cooperating with said chamber walls to form a closure for said upper compartment whereby air is prevented from flowing outwardly of said upper compartment when said door is opened to gain access to said lower compartment, and said partition and said closure member being removable as a unit from said chamber.

13. A refrigerating apparatus including a cabinet having walls defining a chamber therein provided with an access opening normally closed by a door, a partition cooperating with said cabinet chamber walls and with the inner face of said door dividing the chamber into an upper compartment and a lower compartment, said partition normally preventing communication of air between said compartments, a closed primary refrigerating system associated with said cabinet and including an evaporator disposed within said upper compartment, means for cooling the interior of said lower compartment, a member pivotally mounted upon said partition adjacent the front edge thereof and cooperating with said chamber walls to form a closure for said upper compartment whereby air is prevented from flowing outwardly of said upper compartment when said door is opened to gain access to said lower compartment, means for maintaining said closure member in a horizontal position when opened whereby the closure member forms a ledge at the front of said chamber for the support of articles thereon during transfer of the articles from one locality to another in said upper compartment, said partition, said closure member and a part of said means being removable as a unit from said chamber.

14. A refrigerating apparatus including a cabinet having walls defining a chamber therein, a closed refrigerating system associated with said cabinet and including an evaporator disposed within said chamber and forming walls of a freezing compartment therein, means forming walls of a food storage chest within said chamber adjacent said evaporator, and means for applying force to one wall of said chest for maintaining another wall thereof in intimate thermal contact with a wall of said evaporator.

15. A refrigerating apparatus including a cabinet having walls defining a chamber therein, a closed refrigerating system associated with said cabinet and including an evaporator disposed within said chamber at one side thereof and forming walls of a freezing compartment therein, means forming walls of a food storage chest within said chamber adjacent said evaporator, and means for applying force to one side wall of said chest for maintaining another side wall thereof in intimate thermal contact with a side wall of said evaporator.

16. A refrigerating apparatus including a cabinet having walls defining a chamber therein provided with an access opening normally closed by a door, a partition cooperating with said cabinet chamber walls and with the inner face of said door dividing the chamber into a first compartment and a second compartment, a closed primary refrigerating system associated with said cabinet and including an evaporator disposed within said first compartment for cooling same to a low temperature, said evaporator forming walls of a freezing chamber within said first compartment, means forming walls of a food storage chest within said first compartment adjacent said evaporator, means for maintaining a wall of said chest in intimate thermal contact with a wall of said evaporator, a closed secondary refrigerant circuit within said cabinet including a refrigerant condensing portion associated with a part of said primary refrigerating system and a refrigerant evaporating portion disposed in heat exchange relation with said second compartment for cooling same to a temperature higher than the temperature of said first compartment, a movable member forming a common closure for said freezing chamber and said food storage chest, and said movable member cooperating with said cabinet chamber walls to also form a door for said first compartment whereby air is prevented from flowing outwardly of said freezing chamber, said food storage chest and said first compartment when said cabinet chamber door is opened to gain access to said second compartment.

17. A refrigerating apparatus including a cabinet having walls defining a chamber therein, a partition dividing said chamber into an upper food storage compartment and a lower food storage compartment, a closed refrigerating system associated with said cabinet and including an evaporator disposed within said upper food compartment, said partition including a drip pan portion located beneath said evaporator and adapted to receive water which may drip therefrom, a tray supported below said drip pan portion of said partition within said lower food compartment, said drip pan portion of said partition having an opening therein, means for normally closing the opening in said drip pan portion of said partition, said means being movable to open the opening in said drip pan portion whereby water dripping from said evaporator onto said pan will be directed through the opening therein into said tray, and said tray being removable from said lower food compartment for emptying water received thereby therefrom.

18. A refrigerating apparatus including a cabinet having walls defining a chamber therein provided with an access opening normally closed by a door, a partition dividing said chamber into an upper compartment and a lower compartment, a closed refrigerating system associated with said cabinet and including an evaporator disposed in said upper compartment for cooling same, means for cooling said lower compartment, a member cooperating with said partition and said chamber walls normally closing said upper compartment whereby air is prevented from flowing outwardly thereof when said door is opened to gain access to said lower compartment, said partition including a drip pan portion located beneath said evaporator and adapted to receive water which may drip therefrom, a tray supported below said drip pan portion of said partition having an opening therein, means for normally closing the opening in said drip pan portion of said partition, said last named means being movable to open the opening in said drip pan portion whereby water dripping from said evaporator onto said pan will be directed through the opening therein into said tray, and said tray being removable from said lower compartment for emptying water received thereby therefrom when said door is opened and while said closure member remains in its normally closed position.

19. A refrigerating apparatus including a cabinet having an ice-making compartment, a frozen food storage compartment and a high temperature high humidity compartment, a closed primary refrigerating system associated with said cabinet and including an evaporator for directly cooling said ice-making compartment, a chest forming said frozen food storage compartment, means for maintaining a wall of said chest in intimate thermal contact with a wall of said evaporator for cooling the interior of the chest by conduction of heat directly to said evaporator, means for cooling said high temperature high humidity compartment including a closed secondary circuit having a portion thereof in heat exchange relation with said evaporator and another portion in heat exchange relation with said high temperature high humidity compartment.

EDMUND F. SCHWELLER.